US008521077B2

(12) United States Patent
Venable

(10) Patent No.: US 8,521,077 B2
(45) Date of Patent: Aug. 27, 2013

(54) SYSTEM AND METHOD FOR DETECTING UNAUTHORIZED COLLABORATION ON EDUCATIONAL ASSESSMENTS

(75) Inventor: Dennis L. Venable, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 391 days.

(21) Appl. No.: 12/840,584

(22) Filed: Jul. 21, 2010

(65) Prior Publication Data

US 2012/0021398 A1     Jan. 26, 2012

(51) Int. Cl.
*G09B 3/00*        (2006.01)

(52) U.S. Cl.
USPC ............................................ 434/350

(58) Field of Classification Search
USPC ................................... 434/323, 350
See application file for complete search history.

(56) References Cited

U.S. PATENT DOCUMENTS

| | | |
|---|---|---|
| 4,464,118 A | 8/1984 | Scott et al. |
| 4,654,818 A | 3/1987 | Wetterau, Jr. |
| 4,793,810 A | 12/1988 | Beasley, Jr. |
| 5,387,107 A | 2/1995 | Gunter |
| 5,657,256 A | 8/1997 | Swanson |
| 5,709,551 A * | 1/1998 | Clark et al. ............... 434/322 |
| 5,730,602 A | 3/1998 | Gierhart et al. |
| RE36,028 E | 1/1999 | Deesen et al. |
| 5,995,959 A | 11/1999 | Friedman |
| 5,995,961 A | 11/1999 | Levy et al. |
| 6,030,226 A | 2/2000 | Hersh |
| 6,120,300 A | 9/2000 | Ho |
| 6,134,559 A | 10/2000 | Brumme |
| 6,144,838 A | 11/2000 | Sheehan |
| 6,154,757 A | 11/2000 | Krause |
| 6,215,901 B1 | 4/2001 | Schwartz |
| 6,299,452 B1 | 10/2001 | Wasowicz |
| 6,515,690 B1 | 2/2003 | Back |
| 6,523,007 B2 | 2/2003 | Layng |
| 6,606,479 B2 | 8/2003 | Cook et al. |

(Continued)

FOREIGN PATENT DOCUMENTS

| | | |
|---|---|---|
| EP | 553674 A2 | 8/1993 |
| EP | 0556530 | 8/1993 |

(Continued)

OTHER PUBLICATIONS

Bellezza et al. "Detection of Cheating on Multiple-Choice Tests by Using Error-Similarity Analysis". pp. 151-155. vol. 19 Oct. 1989.*

(Continued)

*Primary Examiner* — Robert J Utama
(74) *Attorney, Agent, or Firm* — Fay Sharpe LLP

(57) ABSTRACT

A collaboration detection system and a method for detecting collaboration amongst a class of two or more students in answering a plurality of problems of an assessment administered to the students are provided. The system includes a tangible processor and a memory with instructions to be executed by the tangible processor. The processor executes the instructions for accessing granular assessment data associated with each student. The granular assessment data includes an independent determination of correctness of the answer submitted by the student for each respective problem of the plurality of problems of the assessment. The processor then executes the instructions for determining for each combination of students of the class of students the number of problems for which it was determined that the same problem was answered incorrectly by all of the students of the combination of students.

16 Claims, 4 Drawing Sheets

(56) References Cited

U.S. PATENT DOCUMENTS

| | | |
|---|---|---|
| 6,606,480 B1 | 8/2003 | L'Allier |
| 6,673,611 B2 | 1/2004 | Thompson et al. |
| 6,755,657 B1 | 6/2004 | Wasowicz |
| 6,759,206 B1 | 7/2004 | Rubin et al. |
| 6,789,089 B2 | 9/2004 | Scoggins |
| 6,953,343 B2 | 10/2005 | Townshend |
| 6,983,240 B2 | 1/2006 | Ait-Mokhtar et al. |
| 7,036,075 B2 | 4/2006 | Walker |
| 7,058,567 B2 | 6/2006 | Ait-Mokhtar et al. |
| 7,147,473 B2 | 12/2006 | Harpaz |
| 7,152,034 B1 | 12/2006 | Layng |
| 7,207,804 B2 | 4/2007 | Hersh |
| 7,266,340 B2 | 9/2007 | Bresciani |
| 7,293,239 B2 | 11/2007 | Gorbet |
| 7,593,910 B1 | 9/2009 | Owen |
| 7,734,652 B2 | 6/2010 | Tamayo |
| 7,828,552 B2 | 11/2010 | Shute |
| 2003/0113698 A1 | 6/2003 | Von der Geest |
| 2003/0180703 A1 | 9/2003 | Yates et al. |
| 2003/0190593 A1 | 10/2003 | Wisnoksy |
| 2004/0023191 A1 | 2/2004 | Brown |
| 2004/0049391 A1 | 3/2004 | Polanyi |
| 2004/0076930 A1 | 4/2004 | Steinberg |
| 2004/0121298 A1 | 6/2004 | Creamer |
| 2004/0219502 A1 | 11/2004 | Bechard |
| 2005/0114160 A1 | 5/2005 | Boehme et al. |
| 2005/0138556 A1 | 6/2005 | Brun |
| 2005/0170325 A1 | 8/2005 | Steinberg |
| 2005/0197988 A1 | 9/2005 | Bublitz |
| 2005/0221266 A1 | 10/2005 | Mislevy |
| 2005/0227216 A1 | 10/2005 | Gupta |
| 2006/0040240 A1 | 2/2006 | Kopilevich |
| 2006/0241988 A1 | 10/2006 | Yaskin |
| 2006/0242003 A1 | 10/2006 | Yaskin |
| 2006/0242004 A1 | 10/2006 | Yaskin |
| 2007/0172810 A1 | 7/2007 | McCallum |
| 2007/0179776 A1 | 8/2007 | Segond |
| 2007/0190514 A1 | 8/2007 | Diaz |
| 2007/0218432 A1 | 9/2007 | Glass |
| 2008/0038708 A1 | 2/2008 | Slivka |
| 2009/0204596 A1 | 8/2009 | Brun |
| 2009/0246744 A1 | 10/2009 | Lofthus et al. |
| 2009/0271433 A1 | 10/2009 | Perronnin et al. |
| 2009/0287739 A1 | 11/2009 | Zhang |
| 2010/0075290 A1 | 3/2010 | DeYoung |
| 2010/0100455 A1 | 4/2010 | Song |
| 2010/0158707 A1 | 6/2010 | Griffiths |
| 2010/0227306 A1 | 9/2010 | Lofthus |

FOREIGN PATENT DOCUMENTS

| | | |
|---|---|---|
| EP | 0 805 410 A | 5/1997 |
| EP | 805410 A3 | 3/1999 |
| JP | 2000123115 | 4/2000 |
| JP | 2000123115 A2 | 4/2000 |
| WO | WO 98/32107 | 7/1998 |
| WO | WO 02/21259 | 3/2002 |
| WO | WO 2004/090834 | 10/2004 |
| WO | WO2006121542 A2 | 11/2006 |

OTHER PUBLICATIONS

The Abecedarian Reading Assessment, Sebastian Wren, Ph.D and Jennifer Watts, Ph.D., Copyright, 2002.

Chuat, "CategoriX & ClusteriX", Xerox Research Centre Europe, licensing@xrce.xerox.com (May 2005).

U.S. Appl. No. 12/640,426, filed Dec. 17, 2009, Venable.

U.S. Appl. No. 12/701,850, filed Feb. 8, 2010, DeYoung.

U.S. Appl. No. 12/840,584, filed Jul. 21, 2010, Venable.

U.S. Appl. No. 12/958,768, filed Dec. 2, 2010, German.

Johnson, David W. et al., "An Overview of Cooperative Learning", Cooperative Learning Institute and Interaction Book Company.

Shi, Jianbo et al., "Normalized Cuts and Image Segmentation", IEEE Transactions on Pattern Alanaysis and Machine Intelligence, Vo. 22, No. 8, Aug. 2000.

Wren, Ph.D., Sbebastian et al., "The Abecedarian Reading Assessment", www.balancedreading.com, Copyright, 2002, pp. 1-49.

"Cluster Analysis." Wikipedia, the Free Encyclopedia. Apr. 28, 2010, Web. Jan. 11, 2011. <http://en.wikipedia.org/wiki/Cluster_analysis>.

"Cut (graph theory)." Wikipedia, the Free Encyclopedia. Mar. 26, 2010. Web. Jan. 11, 2011. <http://en.wikipedia.org/wiki/Cut_(graph_theory)>.

"Edmonds's Matching Algorithm." Wikipedia, the Free Encyclopedia. Feb. 16, 2010. Web. Jan. 11, 2011. <http://en.wikipedia.org/wiki/Edmonds's_matching_algorithm>.

"Ford-Fulkerson Algorithm." Wikipedia, the Free Encyclopedia. Apr. 21, 2010. Web. Jan. 11, 2010. <http://en.wikipedia.org/wiki/Ford-Fulkerson_algorithm>.

"k-medoids" Wikipedia, the Free Encyclopedia. Apr. 22, 2010. Web. Jan. 11, 2010. <http://en.wikipedia.org/wiki/K-medoids>.

"Matching (graph theory) )." Wikipedia, the Free Encyclopedia. Apr. 19, 2009. Web. Jan. 11, 2011. <http://en.wikipedia.org/wiki/Matching_(graph_theory)>.

\* cited by examiner

| | APPLE | BERRY | CURRANT | DATE | FIG | GRAPE | JAM | JUNIPER | KIWI | LEMON | LIME | MANDARIN | NECTAR | ORANGE | PEACH | PEAR | PINE | RASPBERRY | SEED | SPRUCE | TANGERINE | VINE | WATERMELON |
|---|---|---|---|---|---|---|---|---|---|---|---|---|---|---|---|---|---|---|---|---|---|---|---|
| APPLE | | | | | | | | | | | | | | | | | | | | | | | |
| BERRY | | | 1 | | | | | | | | | | | | | | | 1 | | | | 1 | 1 |
| CURRANT | | 1 | | | | | | | | | | | | | | | 1 | 1 | | | | 1 | |
| DATE | | | | | 1 | | | | | | | | | | | | | | | | | | |
| FIG | | | | 1 | | 1 | | | | | | | | | 1 | | | | 1 | | | | |
| GRAPE | | | | | 1 | | 2 | | | | 1 | | | | | | 1 | | | | | 4 | 1 |
| JAM | | | | | | 2 | | | | | | | | | 2 | | | | 1 | 2 | 1 | 2 | 1 |
| JUNIPER | | | | | | 1 | | | 1 | | | | | | | | | | | | | | |
| KIWI | | | | | | | | 1 | | 1 | | | | | | | | | | | | | |
| LEMON | | | | | | | | | 1 | | 1 | | | | | | | | | | | | 1 |
| LIME | | | | | | | | | | 1 | | 1 | | | | | | | | | | | |
| MANDARIN | | | | | | | | | | | 1 | | | | | | | | | | | | |
| NECTAR | | | | | | | | | | | | | | | | | | | | | | | 1 |
| ORANGE | | | | | | | | | | | | | | | | | | | 1 | | 1 | | |
| PEACH | | | | | | | | | | | | | | | | 1 | | 1 | 1 | | | | |
| PEAR | | | | | | | | | | | | | | | 1 | | | | | | | 1 | |
| PINE | | | | | | 1 | | | | | | | | | | | | 2 | | | | | 1 |
| RASPBERRY | | 1 | 1 | | | | | | | | | | | | 1 | | 2 | | 1 | | | | 1 |
| SEED | | | | | 1 | | 1 | | | | | | | | 1 | | | 1 | | 1 | | | |
| SPRUCE | | | | | | | 2 | | | | | | | | | | | | 1 | | 2 | 2 | 1 |
| TANGERINE | | | | | | | 1 | | | | | | | | | | | | | 2 | | 1 | 1 |
| VINE | | 1 | 1 | | | 4 | 2 | | | | | | | | | | | | | 2 | 1 | | 1 |
| WATERMELON | | 1 | | | | 1 | 1 | | | 1 | | | | | | | | 1 | | 1 | 1 | 1 | |

FIG. 3

SYSTEM AND METHOD FOR DETECTING UNAUTHORIZED COLLABORATION ON EDUCATIONAL ASSESSMENTS

CROSS-REFERENCE TO RELATED APPLICATIONS

The present application is further related to U.S. patent application Ser. No. 12/109,496, filed on Apr. 25, 2008; U.S. patent application Ser. No. 12/237,692, filed on Sep. 25, 2008; U.S. patent application Ser. Nos. 12/339,771, 12/339,804 both filed on Dec. 19, 2008; U.S. patent application Ser. No. 12/341,659, filed on Dec. 22, 2008; U.S. patent application Ser. No. 12/624,960, filed on Nov. 24, 2009; and U.S. patent application Ser. No. 12/640,426, filed on Dec. 17, 2009.

TECHNICAL FIELD

The present disclosure relates generally to a system and method for detecting unauthorized collaboration on educational assessment. In particular, the present disclosure relates to generating a report that communicates detected unauthorized collaboration by assessment-takers.

BACKGROUND

It is difficult for a teacher to sufficiently monitor students when they are taking an educational assessment in order to determine when one student is copying from another student or when two or more students are collaborating during an educational assessment. Furthermore, information related to unauthorized copying or collaboration may indicate that a student is struggling with learning the material that is being assessed and needs additional educational support.

SUMMARY

The present disclosure is directed to a collaboration detection system for detecting collaboration among a class of two or more students in answering a plurality of problems of an assessment administered to the students. The system includes a tangible processor and a memory with instructions to be executed by the tangible processor. The processor executes the instructions for accessing granular assessment data associated with each student. The granular assessment data includes an independent determination of correctness of the answer submitted by the student for each respective problem of the plurality of problems of the assessment. The processor then executes the instructions for determining for each combination of students of the class of students the number of problems for which it was determined that the same problem was answered incorrectly by all of the students of the combination of students.

The present disclosure is also directed to a method for detecting collaboration among a class of more than two students that were each administered an assessment and each submitted answers to problems included in the assessment by marking the assessment with a stroke that is selected from a variety of at least two types of strokes. The method includes accessing granular assessment data associated with each of the students. The granular assessment data includes an independent determination of correctness of each answer submitted by the student and the answer that was submitted by the student for each incorrect answer. The method also includes determining for each pair of students of the class the number of problems for which it was determined that the problem was answered incorrectly by both students of the pair and both students of the pair submitted substantially the same answer.

The present disclosure is also directed to a report that communicates detection of collaboration among a class of more than two students that were each administered an assessment and student submitted answers to problems included in the assessment by marking the assessment with a stroke that is selected from a variety of at least two types of strokes. The report includes information related to the number of problems of the assessment that were answered incorrectly by both students of each pair of students in the class and for which both students of the pair submitted the same answer.

Other features of the presently disclosed collaboration detection system will become apparent from the following detailed description, taken in conjunction with the accompanying drawings, which illustrate, by way of example, the presently disclosed collaboration detection system.

BRIEF DESCRIPTION OF THE DRAWINGS

Various embodiments of the present disclosure will be described below with reference to the figures, wherein:

FIG. 3 shows a report generated by the service provider shown in FIG. 1 for a class of students that were administered an assessment.

DETAILED DESCRIPTION

Figure 1:
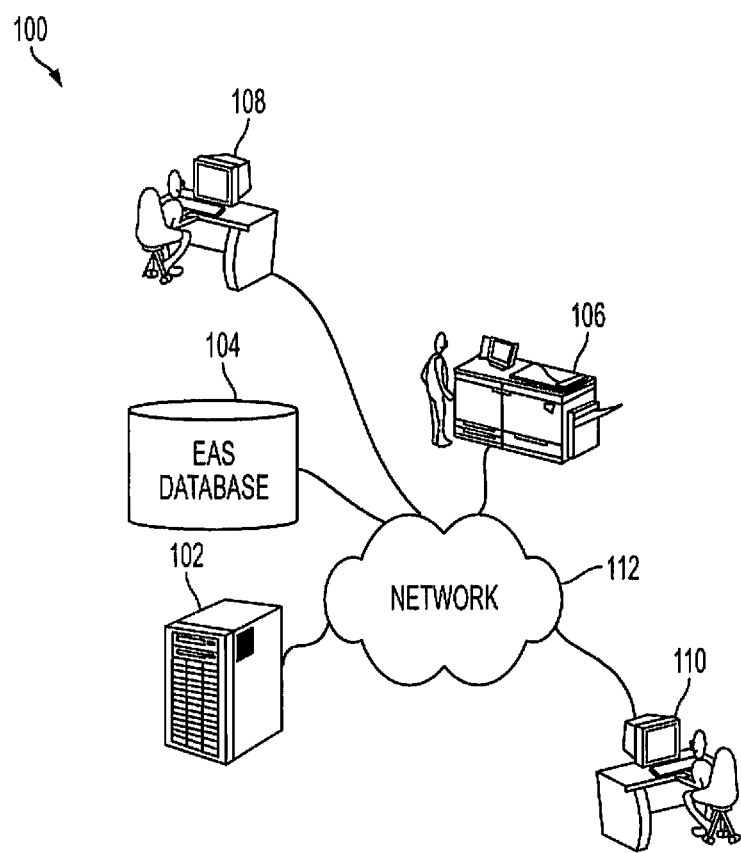
FIG. 1 is a schematic diagram of an exemplary educational collaboration detection system in accordance with the present disclosure.

Referring now to the drawing figures, in which like references numerals identify identical or corresponding elements, the educational collaboration detection system and method in accordance with the present disclosure will now be described in detail. With initial reference to FIG. 1, an exemplary educational collaboration detection system in accordance with the present disclosure is illustrated and is designated generally as educational collaboration detection system 100.

Collaboration detection system 100 includes a server 102, data storage facility 104, at least one multifunction device (MFD) 106 and first and second workstations 108 and 110. Each of the components of collaboration detection system 100 is in data communication with at least one of the other components via network 112.

The server 102 detects collaboration among students that are taking an educational assessment. Collaboration is intended herein to include copying, even when one student is aware that another student is copying from them during administration of an educational assessment. The server 102 detects collaboration by accessing granular assessment data (described further below) that includes data related to what answer a student gave for individual problems included in an assessment, including when the answer was wrong. The server 102 compares wrong answers provided to the assessment problems. The server may make determinations about the strength of the likelihood of collaboration among two or more students based on the comparison. For example, when a pair of students in a class of students has a higher occurrence of having the same wrong answers than other pairs of students in the same class who took the same assessment, the server 102 may determine that there is a relatively strong likelihood of collaboration against that pair of students.

The assessments and granular data are now described. An author can create an assessment at first workstation 108, which may then be stored in data storage facility 104. An assessment may be retrieved from storage and copies may be printed, e.g., using MFD 106. It is also possible that the author created the assessment manually, e.g., by typing or handwriting it. A teacher or administrator may administer the assessment to a group of one or more students, by providing each student with a copy of the assessment.

Each copy of the assessment may be individualized by providing information, such as a unique ID, identification (ID code or name) of the assessment-taker, the date, etc. The individualized information may be encoded, such as in an optical code, e.g., a barcode.

The students take the assessment, including marking the assessment with strokes (e.g., hand drawn strokes using a writing implement, such as a pencil, crayon or pen, or using a digital device) that indicate responses to at least one problem provided by the assessment. The server 102 allows for a variety of strokes to be used, such as lines, alpha-numeric characters, non-solid geometric shapes, solid geometric-shapes, etc. More than one type of stroke may be used per assessment.

The term "problem" is applied broadly herein to refer to a prompt for the student's response or a gauge of the student's progress with respect to a task. For example, a problem may include a math problem, a reading selection that the student reads and is gauged for fluency, a survey question asking for the student's opinion, etc. In some cases, a person other than the student marks the assessment, but for the purpose of simplicity, reference to markings by a student shall also refer to any other person that is marking the assessment. The problems may be presented in a variety of formats, such as multiple choice, fill-in-the-blank, matching (e.g., in which two columns are provided, each having an array of selections, and a selection from one column is matched to a selection in the other column, such as by drawing a line), etc.

The assessment may be administered to the students in a variety of ways, including in writing, digitally, or in audio. When administered in writing, the student may mark the assessment itself or may mark one or more specially provided answer sheets. For simplicity and clarity, the term "marked assessment" includes any of the above. When administered digitally, the assessment is presented to the student via a display device of a computing device, such as personal computer or workstation. The student can mark the assessment with digital strokes by using a user input device, such as a keyboard. When administered in audio, the student may listen to the audio and mark answers on an answer sheet that is included with the assessment. It is also envisioned that the student may answer the assessment verbally. Whether the answer is provided by marking a paper using a handwriting instrument, marking a digital file using a computer, marking a digital recording using a voice, the mark is referred to herein as a stroke. Furthermore, there are typically indicators to the student as to where or when to mark a stroke.

Marked-up paper assessments are submitted to the MFD 106 to be scanned and then stored. The MFD 106 generates image data (e.g., a .pdf or .tif file) that corresponds to each marked assessment. The stored assessments are evaluated by the server 102, which includes retrieving strokes that were made by the students from the generated image data, evaluating the retrieved strokes, and generating evaluation results that correspond to the responses provided to the individual problems in the assessment. These results are granular assessment data, because they provide information about student performance on each individual problem, including if the student's submitted answer was correct or incorrect. Furthermore, if the response to a problem is incorrect, the granular assessment data includes what wrong answer the student submitted, and may further provide information related to what type of mistake the student made. Additionally, the evaluation results may include overall results for portions of the assessment or for the entire assessment.

The evaluated assessments may be validated and annotated by a user of the second workstation 110. The validated assessments may be resubmitted to the server 102, e.g., for reevaluation. The server 102 may generate reports relating to the evaluated and/or validated assessments.

Figure 2:
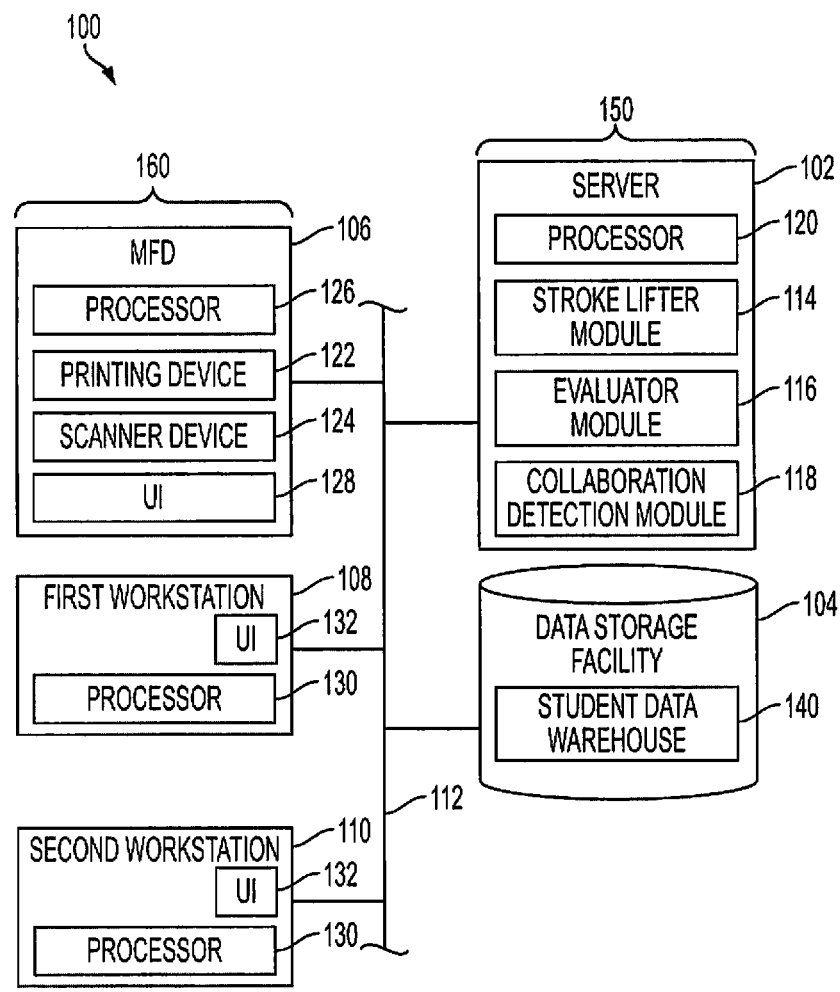
FIG. 2 shows a block diagram of the system shown in FIG. 1.

Referring to FIG. 2, the server 102 is a computing device having at least one hardware processor 120 (e.g., a microprocessor or CPU); at least one storage device (e.g., RAM, ROM, flash memory, removable memory, etc.), and all necessary communication devices for communicating with the data storage facility 104, MFD 106, and/or first or second workstations 108 and 110, either directly or via the network 112. The server 102 may include a web server, a server, a minicomputer, a mainframe computer, a personal computer, a mobile computing device, etc.

The processor 120 executes a stroke lifter software module 114, evaluator software module 116, and a collaboration detection software module 118, each of which is described further below. The stroke lifter software module 114, evaluator software module 116, and collaboration detection software module 118 each include a series of programmable instructions capable of being executed by the processor 120. The series of programmable instructions can be stored on a computer-readable medium accessible by the processor 120, such as RAM, a hard drive, CD, smart card, 3.5" diskette, etc., for performing the functions disclosed herein and to achieve a technical effect in accordance with the disclosure. The functions of the stroke lifter software module 114, evaluator software module 116, and collaboration detection software module 118 may be combined into one module or distributed among a different combination of modules and/or among different servers.

The data storage facility 104 includes at least one nonvolatile storage device for storing information that the server 102 needs to access for detecting collaboration when requested. In the current example, the data storage facility 104 includes a student data warehouse 140. Software necessary for accessing data in the data storage facility 104, including retrieving data, manipulating data and storing data, may be included with the server 102 and/or the data storage facility 104. The server 102 and the data storage facility 104 may be configured as one component or may be configured as separate components which are in data communication.

The data storage facility 104 may be a central database, a distributed database, or may include local storage associated with one or more of the components (e.g., server 102, MFD 106, and first and second workstations 108 and 110) of the collaboration detection system 100. The components may share information, such as assessments, scanned assessments, validated assessments, evaluated assessments and reports related to evaluations of assessments, by storing information on and retrieving information from data storage facility 104. The method of sharing information may be implemented in a number of ways, such as a first component notifying a second component when a particular file is available for the second component to retrieve or process, the first component sending the file to the second component, or the second component checking the data storage facility 104 at regular intervals for files that it needs to retrieve for processing.

The student data warehouse 140 stores student data related to a plurality of students. The student data includes attributes associated with each student, such as, personal data which is substantially static, requiring little or infrequent updating (e.g., name, schools attended, school currently attending, birth date, gender, geographical location, socio-economic information, health information, school district, grade, classroom, etc.); and experiential data which is likely to be dynamic and frequently updated. The experiential data includes attribute data including granular assessment data related to completed assessments (described further below), overall scores on completed assessments, proficiency (e.g., expressed in percentages) in a variety of academic areas, such as academic subjects (e.g., math, reading, division) and/or skills (e.g., critical thinking, penmanship, etc.); past experience and feedback data (e.g., educational activities performed and completed or performed and not yet completed). In one example, a portion of the student data, e.g., the personal data and/or experiential data, may be configured as metadata The MFD 106 includes a printing device 122, a scanner device 124, a processor 126, a user interface (UI) 128, and all necessary communication devices for communicating with the data storage facility 104, server 102, and/or client computing device 108, either directly or via the network 112. The printing device 122, scanner device 124, and processor 126 may be integrated and housed in a single housing or may be separate components which are housed separately and are in data communication with one another. The processor 126 may include at least a first processor associated with the printing device 122 and a second processor associated with the scanner device 124, where the first and second processors in combination perform the functionality of processor 126 described herein. The printing device 122 includes any apparatus or system, such as a digital copier, xerographic printing system, ink jet printing system, reprographic printing system, bookmaking machine, facsimile machine, etc., which performs a marking output function for any purpose. The modality for marking may include, for example, applying toner, ink, dye, etc., to a substrate. The substrate may be a material such as paper, cardboard, a transparency, a paper derivative, etc.

The scanner device 124 of the MFD 106 includes hardware and software for imaging a document and generating corresponding imaging data. The image data is stored by a storage device that is included with the processor 126, and/or a storage device that is accessible to the processor 126, data storage facility 104 and/or the server 102. The processor 126 may execute a scanner software module for processing the image data, and/or the image data may be processed by the server 102.

The UI 128 includes a user input device, such as a keypad, touchpad, touch screen or the equivalent, and a display device, such as indicator lights, a display screen, etc. The UI 128 may provide a GUI via which the user may enter and receive information for interactively exchanging information with the processor 126. The communication devices may be integrated into the MFD 106 or may be provided as a separate unit. In addition to providing communication capabilities, the communication devices may buffer data, such as for safeguarding data in the event of a failure, such as a power failure or network crash.

Each of the first and second workstations 108 and 110 is a computing device, such as personal computer or a mobile computing device, having a hardware processor 130 (e.g., a microprocessor or CPU); a UI 132; at least one storage device (e.g., RAM, ROM, flash memory removable memory, etc.), and all necessary communication devices for communicating with the data storage facility 104, MFD 106, and/or server 102, either directly or via the network 112. The UI 132 includes a user input device, such as a keyboard, keypad, touchpad, mouse, touch screen or the equivalent, and a display device, such as indicator lights, a display screen, etc. The UI 132 may provide a GUI via which the user may enter and receive information for interactively exchanging information with the processor 130. The processor 130 communicates with the server 102, data storage facility 104, and/or MFD 106, including interactively exchanging information with the user via the UI 132, and processes data for providing detection of student collaboration functionality as described further below.

The network 112 may be the Internet, an intranet, an Ethernet, a LAN, a WAN, or other means for providing data communication between a plurality of digital devices. It is also envisioned that the data communication between any of the components of the collaboration detection system 100 may be via a direct connection which may be wired or wireless. In the present example, the network 112 is the Internet.

Operation of the server 102 is now described. The stroke lifter module 114 analyzes image data associated with a scanned assessment. The stroke lifter module 114 recognizes each stroke that was marked by a student on the assessment to indicate a response to an assessment problem, and generates corresponding stroke data. The stroke lifter module 114 may use a digital version of the assessment to distinguish between marks that are part of the assessment and strokes that were marked by the student. In one example, the generated data may be configured as metadata.

The evaluator module 116 analyzes the stroke data to evaluate the student's performance on the assessment and generates evaluation data. The analysis may include performing character recognition techniques, such as Intelligent Character Recognition (ICR) or Optical Character Recognition (OCR). The analysis may further include applying one or more rubrics to determine if the stroke data indicates that a problem was answered correctly or incorrectly, independently determining a score (e.g., right or wrong) for each problem, or determining a score for a group of problems or for the entire assessment. The scores may be, for example, expressed as a percentage and/or a letter academic grade (e.g., A, A−, B, B+, etc.). Information related to the incorrect answer is stored, including the wrong answer itself. When the evaluation module determines that a problem is wrong, it may further determine what type of error the student made and/or what area of an academic topic the student has not mastered. Accordingly, the evaluation data includes granular data that describes the results related to the analysis of individual problems and/or individual incorrect responses for each assessment-taker.

The structure and/or functionality associated with the server 104, MFD 106, and first and second workstations 108 and 110, as well as the functionality of the stroke lifter module 114 and evaluator module 134 are further described, either to supplement the above description or provide alternative designs, by U.S. patent application Ser. No. 12/339,979 to German et al., entitled "SYSTEM AND METHOD FOR RECOMMENDING EDUCATIONAL RESOURCES," filed on Dec. 19, 2008; U.S. patent application Ser. No. 12/340,054 to German et al., entitled "SYSTEM AND METHOD FOR RECOMMENDING EDUCATIONAL RESOURCES," filed on Dec. 19, 2008; U.S. patent application Ser. No. 12/340,116 to German et al., entitled "SYSTEM AND METHOD FOR RECOMMENDING EDUCATIONAL RESOURCES," filed on Dec. 19, 2008; U.S. patent application Ser. No. 12/237,692 to DeYoung et al., entitled "AUTOMATIC EDUCATIONAL ASSESSMENT SERVICE," filed on Sep. 25, 2008; U.S. patent application Ser. No. 12/339,804 to DeYoung et al., entitled "AUTOMATIC EDUCATION ASSESSMENT SERVICE," filed on Dec. 19, 2008; U.S. patent application Ser. No. 12/339,771 to DeYoung et al., entitled "AUTOMATIC EDUCATIONAL ASSESSMENT SERVICE," filed on Dec. 19, 2008; U.S. patent application Ser. No. 12/341,659 to Lofthus et al., entitled "SYSTEM FOR AUTHORING EDUCATIONAL ASSESSMENTS," filed on Dec. 22, 2008; U.S. patent application Ser. No. 12/640,426 to Venable, entitled "SYSTEM AND METHOD FOR REPRESENTING DIGITAL ASSESSMENTS," filed on Dec. 17, 2009; and U.S. application Ser. No. 12/624,960, to Perronnin et al., entitled "DIALOG SYSTEM FOR COMPREHENSION EVALUATION," filed on Nov. 24, 2009, each of which has been incorporated herein by reference in their entirety.

In one embodiment of the collaboration detection system 100, the server 102 and data storage facility 104, referred to as the collaboration detection service (CDS) provider 150, provide a service to a client 160. The client includes any combination of the MFD 106 and the first and second workstations 108 and 110. Each client 160 may gain access to the service provided by the CDS provider 150, such as by subscribing to the service and/or loading appropriate software onto at least one MFD 106 and/or first and second workstations 108 and 110. The appropriate software may include application software data, such as the ERI software module. It is also envisioned that the CDS provider 150 provides a website that the client 160 can access and use to access the service provided by the CDS provider 150. The clients 160 may access the service for submitting a request for detection of student collaboration or for submitting student data to be stored in the data storage facility 104.

The service provider 150 receives and processes a request for detection of student collaboration. The request may include, for example, scanned in marked assessments associated with administration of a selected assessment for a group of two or more assessment-takers. If the service provider 150 has already stored the scanned in marked assessments associated with the two or more assessment-takers and the selected assessment and/or has performed any analysis or evaluation of the scanned in marked assessments, then the request should provide sufficient data to identify that stored information.

The request is processed by the service provider 150. If not done yet, the stroke lifter module 114 lifts strokes from the scanned assessments and the evaluator module 116 evaluates the lifted stroke results for identifying wrong answers. For each student, the collaboration detection module 118 then compares the student's wrong answers with the wrong answers of each of the other students. This comparison may be done by comparing the student's wrong answers with those of each of the other students one at a time, such as in a pair-wise fashion.

The comparison can be made for combinations of students. A combination can be a pair or include a different number, typically a small number, of students, such as three or four students. While the examples below may refer to pairs of students, they are not limited thereto and may refer to other combinations of students. Next the collaboration detection module 118 determines the strength of the likelihood of collaboration for the combinations of students based on the number of problems for which all of the students in the combination all had a wrong answer. Furthermore, the determination of strength of likelihood of collaboration may be based on the number of problems for which all of the students in the combination all had a substantially identical wrong answer. The criteria for determining that two students have substantially the same or identical answers may be according to design choice.

In addition, a determination may be made as to which student combinations had an inordinate number of problems for which all of the students in the combination all had a wrong answer or had substantially the same wrong answer. While the determination that a pair of students had an inordinate number of substantially identical wrong answers is not sufficient to conclude that the pair of students collaborated, it may be an indication of collaboration.

The collaboration detection module 118 generates a report that includes for each possible pair of students in a class of n students the number of wrong answers that both students in the pair answered incorrectly. The report may further include the number of wrong answers that both students in the pair answered incorrectly in the same way by providing the same incorrect answer. The report may further indicate which pairs of students had an inordinate number of substantially identical wrong answers, such as by highlighting those student pairs in the report with color or bold markings or making a list of those pairs of students.

The criteria for determining whether a pair of students had an inordinate number of substantially identical wrong answers may be according to design choice. Furthermore, these criteria may be selectable by the user who submitted the request for the collaboration determination via the user interface 132. The collaboration detection module 118 will use a criterion selected by the user. Examples of criterion for determining if a number of substantially identical wrong answers is inordinate includes, but is not limited to, exceeding a threshold number, where the threshold number may be selectable or may be calculated as a selectable percentage of the total number of answers provided per student per assessment; exceeding the average or mean number of substantially identical wrong answers for a class of students by a selectable amount; or having the maximum number of substantially identical wrong answers in the class of students.

Additionally, the report may be correlated with a digital seating chart of the class. An analysis of the report and the seating chart may yield information that increases or decreases the possibility of collaboration. When a pair of students who had an inordinate number of substantially identical wrong answers are seated in adjacent rows or columns, the likelihood of collaboration increases. When the pair of students are seated distant from one another the likelihood of collaboration decreases.

In one example the granular data further includes historical data relating to each student of the n students in the class. The historical data includes previous determinations of strength of likelihood of collaboration for the respective students. The service provider 150 may examine the historical data related to any of the students included in a pair for which it was determined that there was a high strength of likelihood of collaboration. The examination may include looking for a pattern of collaboration by any student. The search for a pattern may include looking for a pattern of collaboration in any particular subject (including any sub-topics of the subject). If a pattern is found for a student it may indicate that the student is having difficulty learning subject matter, Additionally, if there is a pattern of collaboration with respect to any subject it may indicate that the student needs remediation in that subject.

FIG. 3 shows an example of a report 300 that was generated by the service provider 150 for a class of n students that took a selected assessment, where n≧2. All of the names 306 of the students in the class are listed in a row 302 and a column 304, forming a matrix 308. A triangular matrix 312 that lies above (or alternatively below) the diagonal 310 includes an entry 314 for each pair of students. In each entry 314 there is entered the number of wrong answers that the students in the associated pair answered wrong and in substantially the same way with substantially the same wrong answer. The number of wrong answers entered in entry 316 is greater than the other entries and may indicate that there is a strong likelihood that the students in the pair that corresponds to entry 316, namely Fig and Vine, may have collaborated when taking the assessment. Depending on the criteria used, the collaboration determination module 118 may determine that Fig and Vine had an inordinate number of substantially identical wrong answers, and this may be indicated on the report, such as by printing or displaying entry 316 in a different color than the other entries. While the information provided by the report is not conclusive, it provides additional information that the educator who administered the assessment and/or taught the material being assessed may use if the educator suspects that there may have been collaboration.

Table 1 shows pseudo code for creating an array that stores the number of questions that both students in each pair of students had incorrect with the same incorrect answer. The numbers stored in the area may be included in a report, such via a graph similar to the graph shown in FIG. 3. The report may include all of the information in the array or only selected information. For example, a threshold value may be selected so that only student pairs that have more commonly wrong answers than the threshold are included in the report. In another example, the report may be correlated with a seating chart so that only student pairs that sit next to each other and have commonly wrong answers are included in the report.

TABLE 1

Pseudo-Code For Detecting Collaboration Among Pairs of Students

```
// Given job defined by: jobid
Job job = DataWarehouse.getJob(jobid);
// Identify students in the job
List<Student> lstds = new List<Student>( );
foreach (Student s in job.Students)
    lstds.Add(s);
// sort into alphabetical order
lstds.SortAlphabeticalByName( )
// create an array to store pairwise data
int [ ] [ ] counts = new int[lstds.Count] [lstds.Count];
// for each pair of students, count #answered incorrectly the same way
for (int s1=0; s1<lstds.Count; ++s1)
    for (int s2=0; s2<lstds.Count; ++s2)
    {
        // skip comparing a student to him/her self
        if (s1 equals s2)
            skip;
        // count number of questions that were answered incorrectly in
the same manner
        for (int q=0; q<job.Questions.Count; ++q)
        {
            string correct_answer = job.Questions[q].CorrectAnswer;
            string student1_answer = lstds[s1] .Questions[q] .Answer;
            string student2_answer = lstds[s2] .Questions[q] .Answer;
            // if both students gave the same, incorrect answer, then
        increment 'counts'
            if    (student1_answer NOTEQUAL correct_answer AND
                   student2_answer NOTEQUAL correct_answer AND
                   student1_answer EQUAL student2_answer)
                counts [s1] [s2] = counts [s1] [s2] + 1;
        }
    }
```

Figure 4:
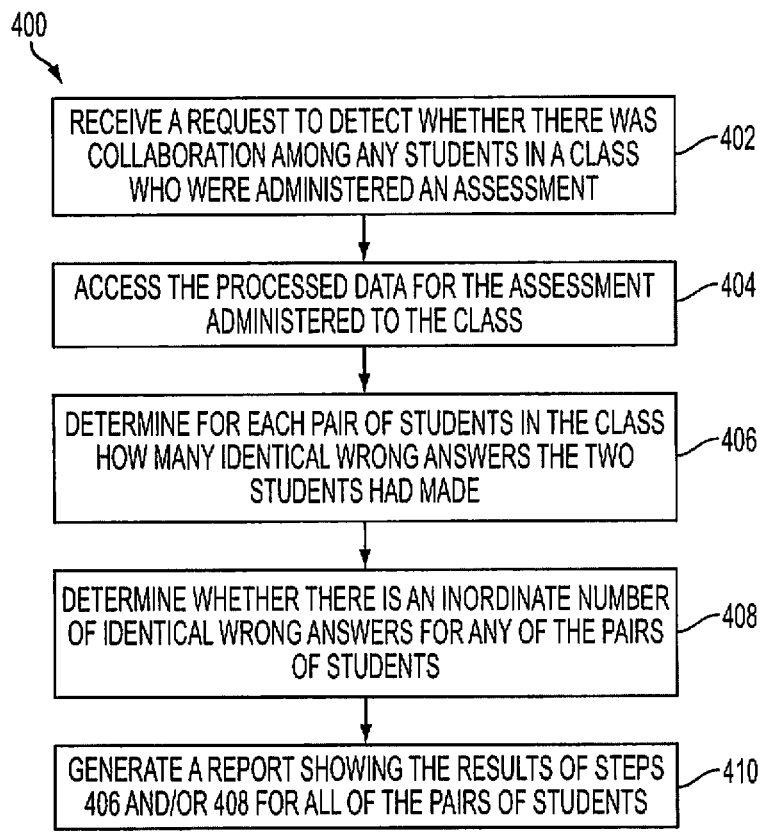
FIG. 4 shows a flowchart of a method for detecting collaboration among a class of two or more students in accordance with the present disclosure.

FIG. 4 shows a flowchart 400 of a method for detecting collaboration among a class of two or more students. This method assumes that scanned marked assessment data associated with administration of an assessment to the class has already been received and processed. The processing includes that strokes were lifted for each scanned marked assessment and each marked assessment was evaluated for determining which answers were wrong and what the wrong answer was. At step 402, the collaboration detection module 118 receives a request to detect whether there was collaboration among any students in the class. At step 404, the collaboration detection module 118 accesses the processed data for the assessment administered to the class. At step 406, the collaboration detection module 118 determines for each pair of students in the class how many substantially identical wrong answers the two students had made. At step 408, the collaboration detection module 118 determines whether there are an inordinate number of substantially identical wrong answers for any of the pairs of students. At step 410, the collaboration detection module 118 generates a report showing the results of steps 406 and/or 408 for all of the pairs of students.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A collaboration detection system for detecting collaboration among a class of n students in answering a plurality of problems of an assessment administered to the n students, wherein n≧2, the system comprising:
    a tangible processor; and
    a memory with instructions to be executed by the tangible processor for:
        accessing granular assessment data associated with each student of the n students, the granular assessment data including an independent determination of correctness of an answer submitted by the student for each respective problem of the plurality of problems of the assessment and further including historical data, the historical data including previous determinations of a strength of likelihood of collaboration between each combination of the n students;
        determining for each combination a number of problems that were answered incorrectly by each student of the combination; and
        determining for each combination a strength of likelihood of collaboration based on the determined number of problems and an examining of the historical data related to any combination that was determined to have a high strength of likelihood of collaboration to determine a pattern of collaboration between any combination in any other particular subject or any subtopic of the subject.

2. The collaboration detection system according to claim 1, wherein the memory further stores instructions to be executed by the tangible processor for consulting a seating chart that indicates seating of the n students during administration of the assessment for examining the seating of the students included in a combination for which it was determined that there was a high strength of likelihood of collaboration.

3. The collaboration detection system according to claim 1, wherein the n students were administered the assessment at the same time.

4. The collaboration detection system according to claim 1, wherein the n students submitted their answers to the plurality of problems by marking the administered assessment with a stroke that is selected from a variety of at least two types of strokes.

5. The collaboration detection system according to claim 1, wherein the at least two types of strokes include hand-written lines, alpha-numeric characters, and non-solid geometric shapes.

6. The collaboration detection system according to claim 1, wherein the granular assessment data associated with each student further comprises the answer given for each answer determined to be incorrect, and the memory further stores instructions to be executed by the tangible processor for determining for each combination of students whether all of the students of the combination of students submitted substantially the same answer.

7. The collaboration detection system according to claim 1, wherein the combination of students is a pair of students.

8. A method for detecting collaboration among a class of n students in answering a plurality of problems of an assessment administered to the n students, wherein $n \geq 2$, the method for detecting comprising:
- accessing by a tangible processor granular assessment data associated with each student of the n students, the granular assessment data including:
  - an independent determination of correctness of the answer submitted by the student for each respective problem of the plurality of problems of the assessment;
  - the answer that was submitted by the student for each incorrect answer; and
  - historical data, the historical data including previous determinations of a strength of likelihood of collaboration; and
- determining for each pair of students of the n students a number of problems in which:
  - the problem was answered incorrectly by the pair; and
  - the pair submitted substantially the same answer; wherein each of the n students submitted answers to the plurality of problems by marking the administered assessment with a stroke that is selected from a variety of at least two types of strokes; and
- determining for each pair a strength of likelihood of collaboration based on the determined number of problems and an examining of the historical data related to the pair that was determined to have a high strength of likelihood of collaboration to determine a pattern of collaboration between any combination in any other particular subject or any subtopic of the subject.

9. The method according to claim 8, further comprising:
consulting a seating chart that indicates seating of the n students during administration of the assessment; and
examining the seating of the students included in a pair for which it was determined that there was a high strength of likelihood of collaboration.

10. The method according to claim 8, wherein the at least two types of strokes include hand-written lines, alpha-numeric characters, and non-solid geometric shapes.

11. A report communicating the detection of collaboration among a class of n students in answering a plurality of problems of an assessment administered to the n students, wherein $n \geq 2$, the report comprising:
- information related to the number of problems of the plurality of problems for each pair of students of the n students that was answered incorrectly by both students of the pair of students and for which both students of the pair of students submitted the same answer;
- information related to the history of the number of problems of a previous plurality of problems that were answered incorrectly by the pair and for which the pair submitted the same answer; and
- a determination of a pattern of collaboration by the pair for a in any other particular subject or any subtopic of the subject;
- wherein each of the n students submitted answers to the plurality of problems by marking the administered assessment with a stroke that is selected from a variety of at least two types of strokes.

12. The report in accordance with claim 11, wherein the report indicates pairs of students for which there is a strong likelihood of collaboration based on the determined number of problems.

13. The report in accordance with claim 11, wherein the report further indicates pairs of students that are seated adjacent to one another.

14. The report according to claim 11, wherein the at least two types of strokes include hand-written lines, alpha-numeric characters, and non-solid geometric shapes.

15. The report according to claim 11, wherein the report includes a column that corresponds to each student and a row that corresponds to each student forming a matrix having one entry that correspond to each pair of students.

16. The report in accordance with claim 15, wherein the matrix is triangular, and the determined number of problems that corresponds to the respective pairs of students is indicated in the corresponding entry.

* * * * *